US012502837B2

(12) United States Patent
Cameno Salinas et al.

(10) Patent No.: US 12,502,837 B2
(45) Date of Patent: Dec. 23, 2025

(54) PRINTING WITH MULTIPLE CARRIAGES

(71) Applicant: Peridot Print LLC, Palo Alto, CA (US)

(72) Inventors: Alfonso Cameno Salinas, Sant Cugat del Valles (ES); Xavier Castano Muniz, Sant Cugat del Valles (ES); Esteve Comas Cespedes, Sant Cugat del Valles (ES)

(73) Assignee: Peridot Print LLC, Palo Alto, CA (US)

(*) Notice: Subject to any disclaimer, the term of this patent is extended or adjusted under 35 U.S.C. 154(b) by 310 days.

(21) Appl. No.: 18/032,703

(22) PCT Filed: Oct. 20, 2020

(86) PCT No.: PCT/US2020/056474
§ 371 (c)(1),
(2) Date: Apr. 19, 2023

(87) PCT Pub. No.: WO2022/086503
PCT Pub. Date: Apr. 28, 2022

(65) Prior Publication Data
US 2023/0405923 A1    Dec. 21, 2023

(51) Int. Cl.
*B29C 64/393*    (2017.01)
*B29C 64/165*    (2017.01)
(Continued)

(52) U.S. Cl.
CPC .......... *B29C 64/393* (2017.08); *B29C 64/165* (2017.08); *B33Y 10/00* (2014.12); *B33Y 30/00* (2014.12); *B33Y 50/02* (2014.12)

(58) Field of Classification Search
CPC .... B29C 64/336; B29C 64/165; B29C 64/393
See application file for complete search history.

(56) References Cited

U.S. PATENT DOCUMENTS 4,511,907 A * 4/1985 Fukuchi ................. G01D 15/18
347/43
5,250,956 A * 10/1993 Haselby .................. B41J 11/46
400/82

(Continued)

FOREIGN PATENT DOCUMENTS

EP          3492244 A1      6/2019
WO       2017/023281 A1     2/2017
WO    WO-2018194668 A1 *   10/2018 ........... B29C 64/205

*Primary Examiner* — John J DeRusso
(74) *Attorney, Agent, or Firm* — Shook, Hardy & Bacon L.L.P.

(57)    ABSTRACT

A printing apparatus is disclosed herein. The apparatus comprises a first carriage, moveable along an axis, comprising a first print agent dispenser to selectively eject a first set of print agents; a second carriage, moveable along the axis, comprising a second print agent dispenser to selectively eject a second set of print agents to the build material layer; and a controller. The controller is to receive data corresponding to a print job; determine a first amount of the first set of print agents and a second amount of the second set of print agents to be ejected at a print area based on the received data; determine a first delay between the ejection of the first amount of the first set of print agents and the second amount of the second set of print agents at the print area; and to independently control the movement of the first and second carriages and the ejection of print agents from the first and second print agent dispensers based on the determined first delay to generate the print job.

14 Claims, 3 Drawing Sheets

(51) Int. Cl.
 *B33Y 10/00* (2015.01)
 *B33Y 30/00* (2015.01)
 *B33Y 50/02* (2015.01)

(56) References Cited

U.S. PATENT DOCUMENTS

| | | | |
|---|---|---|---|
| 5,608,439 A * | 3/1997 | Arbeiter | B41J 25/3082 |
| | | | 347/102 |
| 7,284,821 B2 | 10/2007 | Jones et al. | |
| 2004/0003741 A1 | 1/2004 | Iskra et al. | |
| 2016/0151973 A1 | 6/2016 | Juan et al. | |
| 2016/0339636 A1* | 11/2016 | De Pena | B29C 64/393 |
| 2017/0072463 A1 | 3/2017 | Ng et al. | |
| 2017/0341365 A1 | 11/2017 | De Lajudie et al. | |
| 2018/0259939 A1 | 9/2018 | Garcia et al. | |
| 2019/0308406 A1 | 10/2019 | Ng et al. | |
| 2019/0351667 A1 | 11/2019 | Ng et al. | |
| 2021/0354369 A1* | 11/2021 | Guan | B29C 64/124 |

* cited by examiner

PRINTING WITH MULTIPLE CARRIAGES

BACKGROUND

Some additive manufacturing or three-dimensional printing systems generate 3D objects by selectively solidifying portions of successively formed layers of build material on a layer-by-layer basis. The build material which has not been solidified is separated from the 3D objects to continue with the additive manufacturing process.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1A:
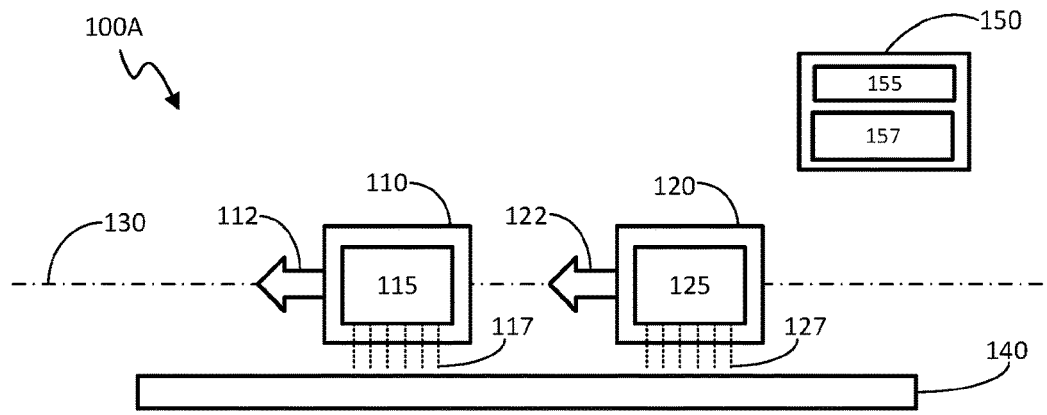
FIG. 1A is a schematic diagram showing an example of a printing apparatus comprising a plurality of carriages.

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same functionality.

Printing platforms use carriages comprising a set of printheads to eject print agents to a substrate. 2D printers eject print agents, such as inks, to a given recording media such as paper, cardboard, metal or wood. In some examples, the recording media moves in a direction substantially perpendicular to the longitudinal axis of a carriage. The carriages and the printheads are, therefore, controlled such that the intended print job is accurately recorded on the media.

Other printing platforms, such as 3D printers, generate 3D objects based on data in a 3D virtual model of an object or objects to be generated. 3D printers may generate 3D objects by selectively processing layers of build material. For example, a 3D printer may selectively treat portions of a layer of build material, e.g. a powder, corresponding to a layer of a 3D object to be generated, thereby leaving the portions of the layer un-treated in the areas where no 3D object is to be generated. The combination of the generated 3D objects and the un-treated build material may also be referred to as a build cake. The volume in which the build cake is generated may be referred to as a build chamber.

3D printers may selectively treat portions of a layer of build material by, for example, ejecting a print agent in a pattern corresponding to the 3D object. Examples of print agents may include fusing agents, detailing agents, curable binder agents or any printing liquid suitable for the generation of a 3D object. Additionally, the chemical composition of some printing liquids may include, for example, a liquid vehicle and/or solvent to be at least partially evaporated once the printing liquid have been applied to the build material layer. For simplicity, the liquid vehicle and/or solvents are be referred hereinafter as solvents.

Some three-dimensional printing systems use fusing agents to treat the portions of the layer of build material. The portions in which the fusing agent is applied are further heated so that the fusing agent absorbs such energy to heat up and melt, coalesce and solidify upon cooling the portions of build material on which the fusing agent was ejected. The three-dimensional printing system may heat the build material by applying energy from an energy source to each layer of build material.

Some three-dimensional printing systems use a thermally curable binder agent which has to be heated to a predetermined temperature to cause components of the liquid binder agent to bind together particles of build material on which it is applied. Such a liquid binder agent may comprise latex particles and curing of the binder may occur, for example, at a temperature above 40 degrees Celsius, above 70 degrees Celsius, above 100 degrees Celsius, or above 120 degrees Celsius, or above 150 degrees Celsius.

Such binder agents may be applied to successive layers of powdered metal build material, such as powdered stainless steel (e.g. SS316L) build material, and the curing of the binder agent leads to the generation of so-called "green parts". Green parts are generally relatively low-strength objects formed by a matrix of metal build material particles and cured binder. Green parts are transformed into strong and highly dense final objects by heating them in a sintering furnace or oven to a temperature close to the melting point of the build material used.

In the above examples, 2D and 3D printers comprise a moveable carriage with a print agent dispenser (e.g., a printhead) to eject the corresponding print agent to the appropriate portion of the recording media or build material layer. Accurately controlling the movement of the carriages and the timing of print agent ejection, has an effect on the image quality of a 2D recorded image and the mechanical and/or aesthetic properties of a generated 3D object.

Suitable powder-based build materials for use in additive manufacturing include polymer powder, metal powder or ceramic powder. In some examples, non-powdered build materials may be used such as gels, pastes, and slurries.

Referring now to the drawings, FIG. 1A is a schematic diagram showing an example of a printing apparatus 100A. The printing apparatus may be any apparatus suitable for recording a print agent pattern in a substrate layer, such as a recording media or a build material layer. Examples of printing apparatus comprise desktop 2D printers, 2D large format printers and 3D printers.

The printing apparatus 100A comprises a platform 140 to hold the substrate layer (not shown) thereon. The platform 140 may comprise a substantially horizontal top surface. In some examples, the platform 140 is a static platform or media platen. However, in other examples such as in 3D printers, the platform 140 is a moveable build platform that is, for example, moveable vertically within a build chamber of a 3D printer.

The printing apparatus 100A comprises a first carriage 110 and a second carriage 120 moveable over and across the platform 140. The first and second carriages (110, 120) scan bidirectionally along the same axis 130. The first and second carriages (110, 120) are independently controlled to move one after the other over the platform 140 which enables the first and second carriages (110, 120) to move synchronously or asynchronously with respect to each other.

The first carriage 110 comprises a first print agent dispenser 115 controllable to selectively eject a first set of print agents 117. Similarly, the second carriage 110 comprises a second print agent dispenser 125 controllable to selectively eject a second set of print agents 127. In an example, the print agent dispensers (115, 125) are thermal inkjet printheads or piezoelectric printheads. However, other examples may include any other print agent dispenser suitable for selectively eject an amount of a printing fluid.

In some examples, the first set of print agents 117 and the second set of print agents 127 include the same print agents. In other examples, the first set of print agents 117 and the second set of print agents 127 include a different set of print agents. A set of print agents may include, fusing agent, detailing agent, thermally curable binder agent, colored agents, color ink and any other suitable print agent to be ejected during the processing of a print job by the printing apparatus 100A.

In some examples, the printing apparatus 100A may further comprise a set of print agent reservoirs (not shown) to supply the corresponding print agents to the first and second print agent dispensers 115-125 of the first and second carriages (110, 120). In other examples, however, the printing apparatus 100A may comprise print agent reservoir enclosures within which the print agent reservoirs are to be inserted to, thereby, supply the print agents to the first and second print agent dispensers 115-125. In yet further examples, the first and second print agent dispensers 115-125 are fluidically connected to an external source of print agents.

The printing apparatus 100A further comprises a controller 150. The controller comprises a processor 155 and a memory 157 with specific control instructions stored therein to be executed by the processor 155. The controller 150 may be coupled, either directly or indirectly, to the first and second carriages (110, 120) and the first and second print agent dispensers 115-127. The controller 150 may control at least some of the operations of the elements that it is coupled therewith. The functionality of the controller 150 is described further below with reference to FIG. 2A.

In the examples herein, the controller 150 may be any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller may be, at least partially, implemented in the form of an electronic circuitry. The controller may be a distributed controller, a plurality of controllers, and the like.

Figure 1B:
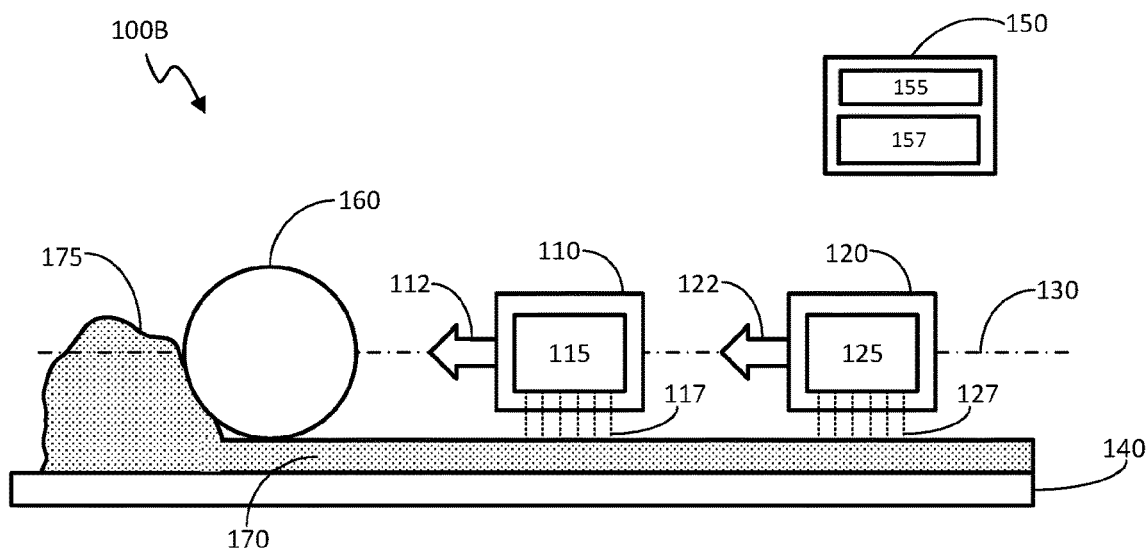
FIG. 1B is a schematic diagram showing an example of a 3D printer comprising a plurality of carriages.

FIG. 1B is a schematic diagram showing an example of a 3D printer 100B. The 3D printer 100B comprises the previously disclosed elements from the printing apparatus 100A of FIG. 1A referred to with the same reference numerals. The 3D printer 100B comprises the platform 140, the first and second carriages (110, 120), the first and second print agent dispensers 115-125 and the controller 150. The controller 150 additionally performs the functionality described further below with reference to FIGS. 2B and 3.

The platform 140 of the 3D printer 100B is a vertically moveable platform on which build material layers are generated. The first and second print agent dispensers 115-125 are controllable by controller 150 to selectively eject print agents (e.g., fusing agent, detailing agent, thermally curable agents) to portions of the build material layers to generate 3D printed objects as described herein.

The 3D printer 100B further comprises a build material distributor 160 moveable along the axis 130 to generate a build material layer 170 on the platform 140 or over an already generated build material layer. The build material distributor 160 may be implemented as a spreading device that spreads an amount of build material 175 across the build platform 140 or across a previously generated build material layer, to generate a newly formed build material layer 170. In some examples, the build material distributor 160 may be a recoating roller or a doctor blade. In other examples, however, the build material distributor may be an overhead hopper that selectively dispenses build material while moving along the axis 130 to thereby generate the build material layer 170.

In some examples, the first carriage 110 is placed in-between the build material distributor 160 and the second carriage 120 such that during a first printing pass the build material distributor 160 is to first generate the build material layer 170, then the first print agent dispenser 115 from the first carriage 110 is to selectively eject the suitable set of first print agents 117, and then the second print agent dispenser 125 from the second carriage 120 is to selectively eject the suitable set of second print agents 127. The proposed 3D printer 100B configuration allows build material layers to be processed in a single direction.

Figure 1C:
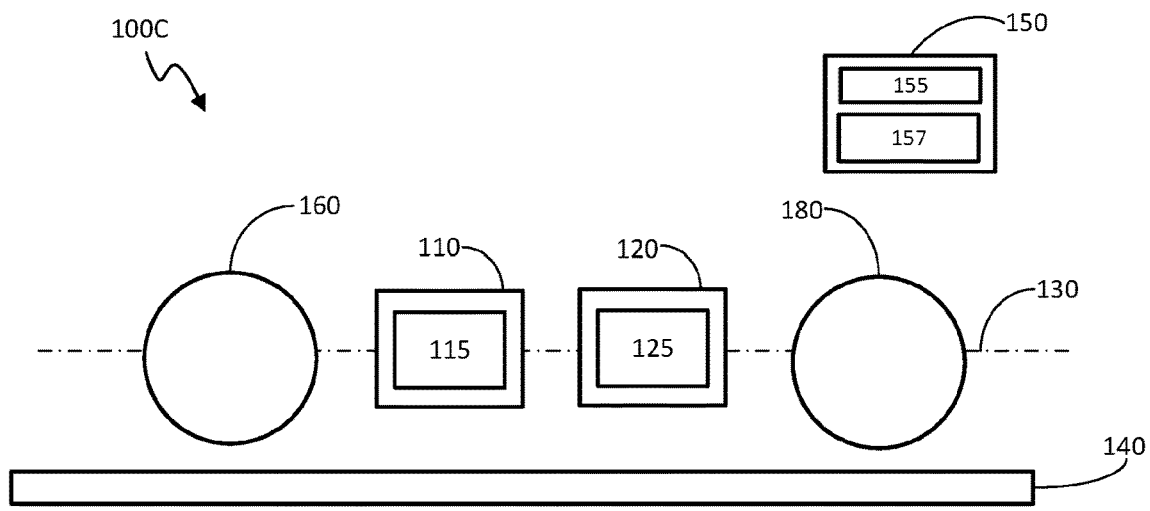
FIG. 1C is a schematic diagram showing another example of a 3D printer comprising a plurality of carriages and a plurality of build material distributors.

FIG. 1C is a schematic diagram showing another example of a 3D printer 100C. The 3D printer 100C involves previously disclosed elements from the 3D printer 100B of FIG. 1B referred to with the same reference numerals. The 3D printer 100C comprises the platform 140, the build material distributor 160, the first and second carriages (110, 120), the first and second print agent dispensers 115-125 and the controller 150. The controller 150 performs the functionality described further below with reference to FIGS. 2B and 3.

In addition to the elements of the 3D printer 100B from FIG. 1B, the 3D printer 100C further comprises an additional build material distributor 180 moveable along the axis 130 to generate a build material layer on the platform 140 or over an already generated build material layer.

The additional build material distributor 180 may be placed in-between the second carriage 120 such that in a second printing pass, performed in a direction opposite to the first printing pass disclosed with reference to FIG. 1B, the additional build material distributor 180 is to first generate a build material layer, the second print agent dispenser 125 from the second carriage 120 is to selectively eject the suitable set of second print agents 127, and then the first print agent dispenser 115 from the first carriage 110 is to selectively eject the suitable set of first print agents 117. The configuration of 3D printer 100C allows build material layers to be processed bidirectionally, thereby doubling the additive manufacturing throughput with respect to the 3D printer 100B.

Figure 2A:
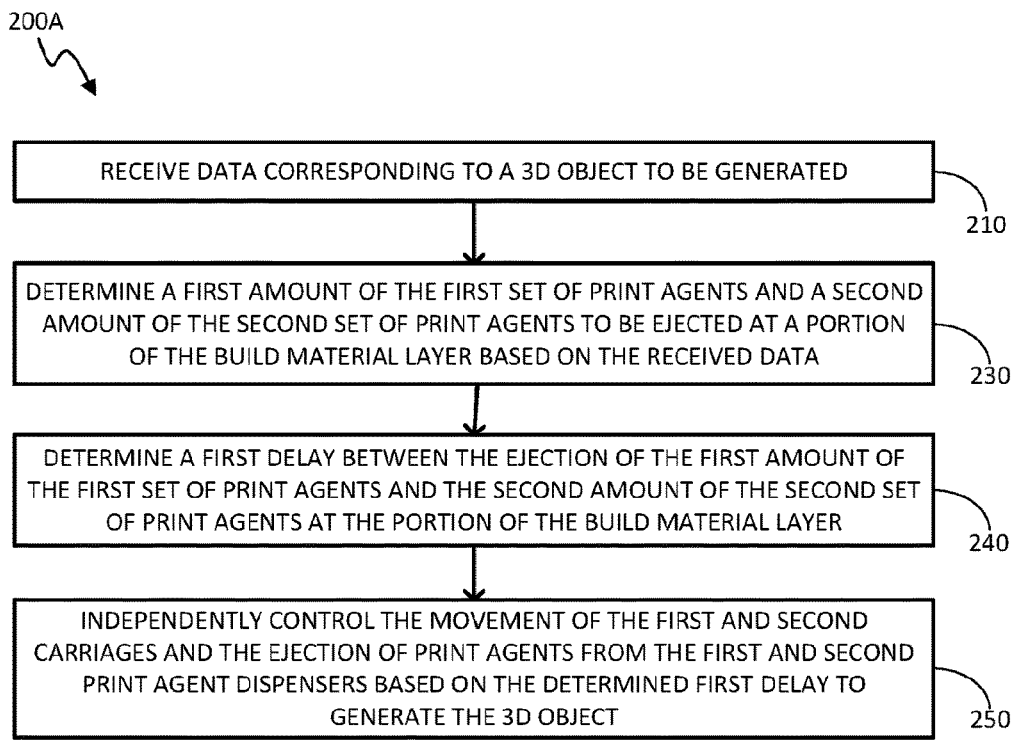
FIG. 2A is a flowchart of an example method of controlling the movement of a plurality of carriages of a printing apparatus.

FIG. 2A is a flowchart of an example method 200A of controlling the movement of a plurality of carriages. The method 200 involves previously disclosed elements from FIG. 1A referred to with the same reference numerals. In some examples, parts of method 200 may be executed by the controller 150 of the printing apparatus 100A.

At block 210, the controller 150 may receive data corresponding to a print job to be generated by the printing apparatus 100A, for example, an image to be recorded on a recording media.

At block 230, the controller 150 determines a first amount of the first set of print agents and a second amount of the second set of print agents to be ejected at a portion of a target area. The controller 150 determines the print agents amounts based on the received data. In these examples, the target area is a print area from the recording media to be used (e.g., paper).

In some examples, the first and/or second set of print agents may comprise a combination of colored printing fluids such as cyan, magenta, yellow and/or black ink. Additionally, the first and/or second print agents may further comprise other non-colored printing fluids such as a varnish or color optimizing print agents.

At block 240, the controller 150 determines a first delay between the ejection of the first amount of the first set of print agents and the second amount of the second set of print agents at the target area. The first delay is therefore the time between the ejection of the first set of print agents and the second set of print agents at a targeted area. The first delay is indicative of the time in which the second carriage 120 moves behind the first carriage 110. In some examples, the controller 150 controls the carriages (110-120) to move at the same speed and controls the second carriage 120 to move at a predetermined time corresponding to the first delay after the first carriage 110. In other examples, however, the controller 150 controls the carriages (110-120) to move at a different speed and controls the second carriage 120 to move at a predetermined time corresponding to the first delay after the first carriage 110. Controlling the duration of the first delay enables the printing apparatus 100A to control the timing between the ejection of different agents to a same location.

At block 250, the controller 150 independently controls the movement of the first and second carriages (110, 120) and the ejection of print agents from the first and second print agent dispensers 115-125 based on the determined first delay and the received data.

Figure 2B:
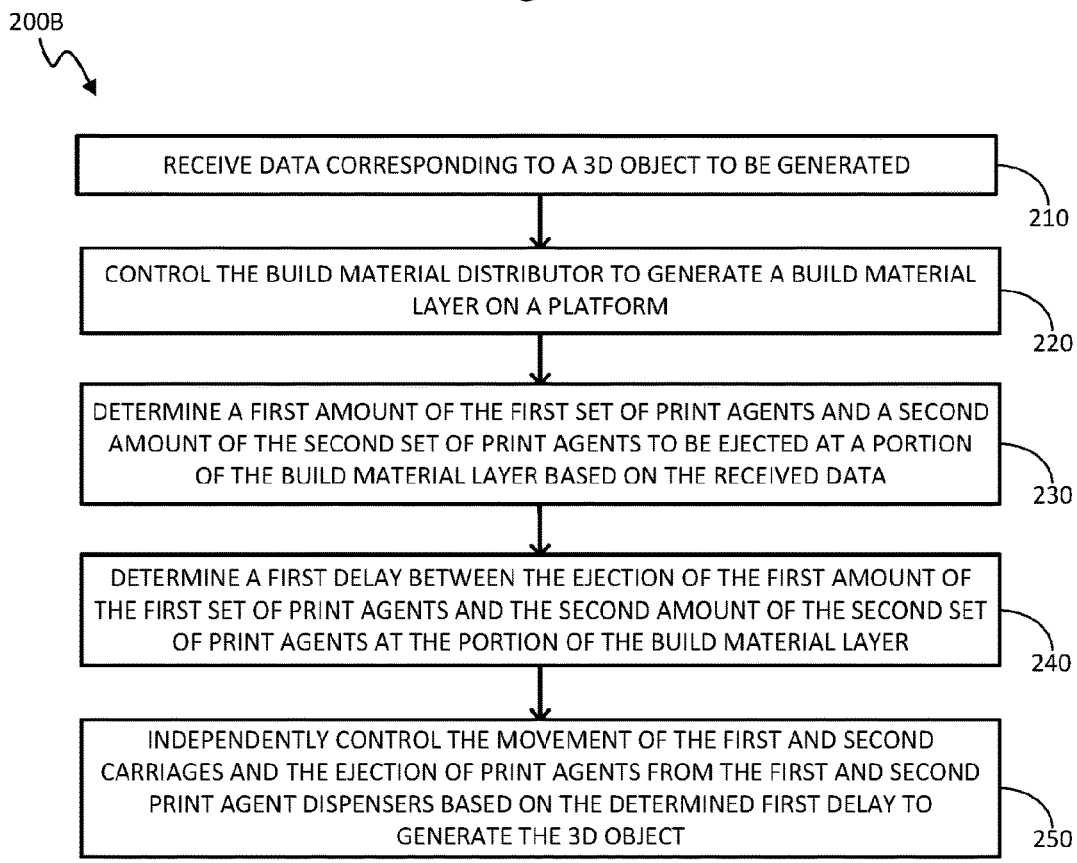
FIG. 2B is a flowchart of an example method of controlling the movement of a plurality of carriages of a 3D printer.

FIG. 2B is a flowchart of an example method 200B of controlling the movement of a plurality of carriages of a 3D printer. The method 200B involves previously disclosed elements from FIGS. 1B and 1C referred to with the same reference numerals. In some examples, parts of method 200 may be executed by the controller 150 of the 3D printers 100B and 100C. Blocks 230, 240, and 250 of method 200B may be the same as or similar to respective blocks 230, 240, 250 of method 200A.

At block 210, the controller 150 may receive data corresponding to a 3D object to be generated. The data may be indicative of special features of the geometry and/or aesthetics of the 3D object to be printed.

Then, the controller 150 executes block 220 in which the controller 150 controls the build material distributor 160 or the additional build material distributor 180 to generate a build material layer 170 on the platform 140 or on a previously generated build material layer.

At block 230, the controller 150 determines a first amount of the first set of print agents and a second amount of the second set of print agents to be ejected at a portion of a target area. In these examples, the target area is an addressable portion of the build material layer 170.

In some examples, the first set of print agents comprises fusing agent and the second set of print agents comprises detailing agent. In these examples, the detailing agent may be deposited at the neighboring areas in which the fusing agent was deposited to reduce the propagation of heat to the non-treated build material portions of the build bed, and thereby reduce the thermal bleed to increase part accuracy and improve surface finish. Additionally, the detailing agent may be also deposited at portions on which fusing agent was previously deposited for thermal control purposes of said portions.

In other examples, the first set of print agents may comprise fusing and detailing agents and the second set of print agents may comprise detailing agent. In these examples, the detailing agent of the first set of print agents may deposited at the neighboring areas in which the fusing agent was deposited to reduce thermal bleed; and the detailing agent of the second set of print agents may be deposited at some of the portions in which the fusing agent was deposited for temperature control purposes at said portions, such that the build material in said portions does not exceed a predetermined temperature value and thereby cause quality defects such as aesthetic and/or mechanical quality defects.

In another example, the first and second sets of print agents may comprise both fusing and detailing agents to be ejected in different points of time. In this example, the controller 150 controls the first print agent dispenser 115 to eject a first amount of fusing agent to a portion of the build material layer 170 when the first carriage 110 reaches the portion, and the second print agent dispenser 125 may eject a second amount of fusing agent to the portion when the second carriage 120 reaches the portion. This example may reduce the splashing effect which may be understood as when an ink drop with a relatively high velocity hits a substrate, part of the drop breaks into smaller droplets which are deposited randomly on the surface. If these splashes are large enough, the result is a visible decrease in the print quality. In this example, the first and/or second print agent dispensers 115-125 may additionally eject a first and/or second amount of detailing agent.

In yet another example, the first and/or the second sets of print agents comprise a thermally curable binding agent to be ejected by the first and/or second print agent dispensers 115-125 to a portion of the build material layer based on the received data.

At block 240, the controller 150 determines a first delay between the ejection of the first amount of the first set of print agents and the second amount of the second set of print agents at the target area. Controlling the duration of the first delay enables the 3D printer 100B-C to control the timing between the ejection of different agents from different carriages to a same location.

3D objects made out of different types of build material may be better manufactured using a different delay between the ejection of the first amount of the first set of print agents and the second amount of the second set of print agents at the target area. In such examples, the controller 150 may identify the type of build material in which the 3D object is to be generated (e.g., stainless steel, polyamide, thermoplastic polyurethane, polypropylene, etc.).

The controller 150 may additionally determine the first delay based on the type of build material by, for example, using a look-up table or an encoded data library. Therefore, in such examples, the time between the ejection of the first set of print agents and the second set of print agents at a targeted area may be controlled to be different for different types of build material (e.g., polyamides, thermoplastic polyurethane).

At block 250, the controller 150 independently controls the movement of the first and second carriages (110, 120) and the ejection of print agents from the first and second print agent dispensers 115-125 based on the determined first delay and the received data.

Figure 3:
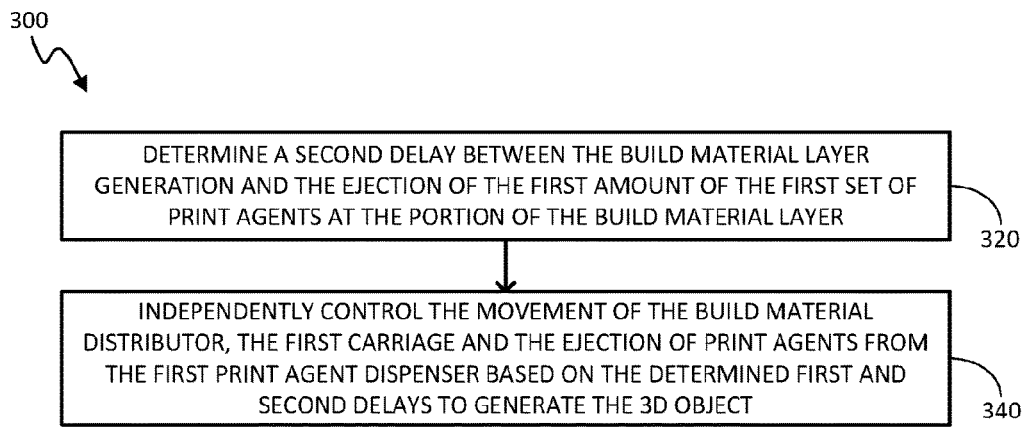
FIG. 3 is a flowchart of an example method of controlling the movement of a build material distributor and a carriage.

FIG. 3 is a flowchart of an example method 300 of controlling the movement of a build material distributor 160 and a carriage (110, 120). In some examples, the controller 150 controls the movement of the additional build material distributor 180 by executing method 300. The method 300 may involve previously disclosed elements from FIG. 1B-1C referred to with the same reference numerals. In some examples, parts of method 300 may be executed by the controller 150 of the 3D printers 100B-100C. In some examples, method 300 may be executed in addition to method 200 from FIG. 2B, for example after block 210 of method 200B.

At block 320, the controller 150 determines a second delay between the build material layer 170 generation and the ejection of the first amount of the first set of print agents at a portion of the build material layer 170. The second delay is therefore the time between the build material layer generation and the ejection of the first set of print agents at a portion of the build material layer 170. Controlling the duration of the second delay enables the 3D printer 100B-C to fine tune the timings between the build material layer generation and the ejection of print agents, and therefore, to optimize the interaction effect between the build material and the ejected print agents. The second delay may also be based on the type of build material to be used to generate the 3D object.

At block 340, the controller 150 independently controls the movement of the build material distributor 160, the first carriage 110 and the ejection of print agents from the first print agent dispenser 115 based on the determined first and second delays to generate the 3D object.

Figure 4A:
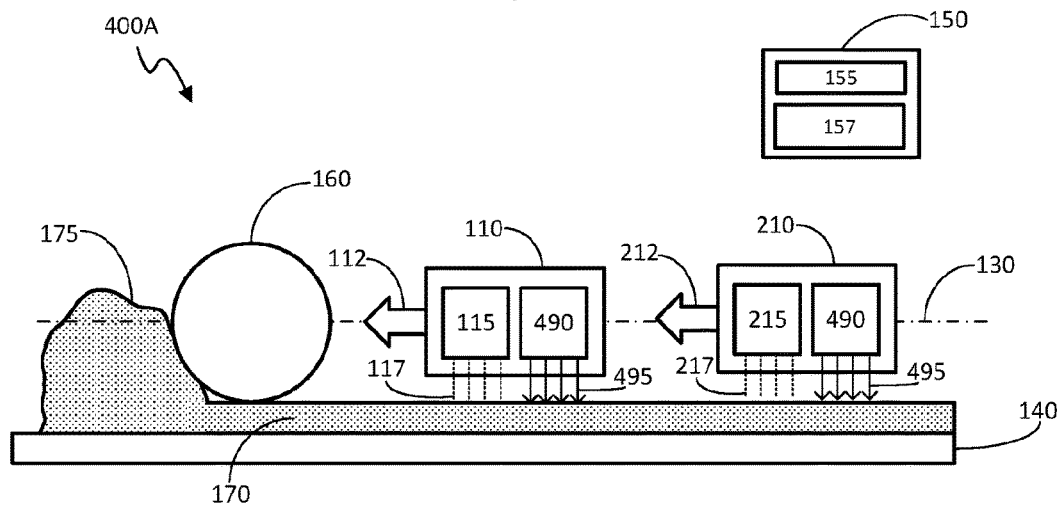
FIG. 4A is a schematic diagram showing an example of another 3D printer comprising a plurality of carriages and a build material distributor.
Figure 4B:
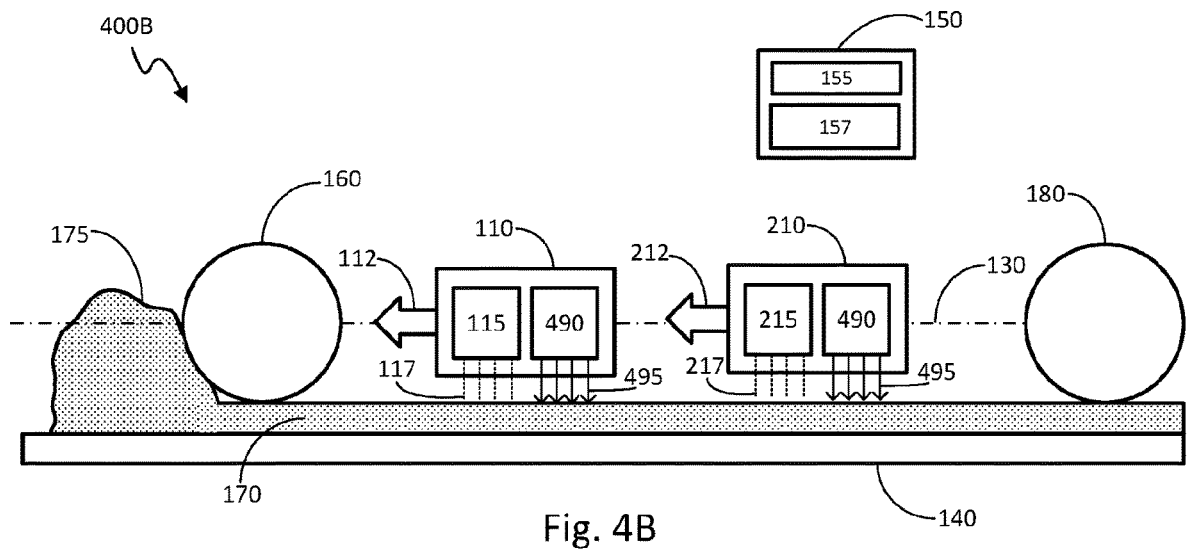
FIG. 4B schematic diagram showing an example of another 3D printer comprising a plurality of carriages and a plurality of build material distributors.

FIGS. 4A and 4B are schematic diagrams showing examples of other 3D printers 400A and 400B comprising a plurality of carriages and a build material distributor. The 3D printer 400A may involve previously disclosed elements from the 3D printer 100B of FIG. 1B referred to with the same reference numerals. The 3D printer 400B may involve previously disclosed elements from the 3D printer 100C of FIG. 1C referred to with the same reference numerals. For simplicity, the 3D printers 400A and 400B may be referred hereinafter as 3D printer 400.

The 3D printer 400 comprises the platform 140, the build material distributor 160, the first and second carriages (110, 120), the first and second print agent dispensers 115-125 and the controller 150. The controller 150 may perform the functionality described in FIGS. 2B and 3.

The 3D printer 400 further comprises an energy source 490 in the first carriage 110 and/or the second carriage 120. The energy source 490 is controllable to emit energy 495 to the build material layer 170. In an example, the energy source 490 may emit energy 495 at a wide range of wavelengths, such as a halogen lamp. In other examples, the energy source 490 may comprise an array of solid-state emitters. In an example, the array of solid-state emitters is an array of Light-Emitting Diodes (LED), an array of Laser Diodes (LD) such as Edge Laser Diodes (ELD), or an array of Vertical-Cavity Surface-Emitting Lasers (VCSEL). In yet another example, the array of solid-state emitters may be a combination of at least two of LEDs, LDs and VCSELS.

LEDs, LDs and VCSELs are formed by semiconductor diodes. The choice of the semiconductor material determines the wavelength of the emitted light beam, which may range from the infra-red to the UV spectrum. In the examples herein, the type of solid-state emitters of the solid-state emitters array is selected to emit energy 495 in a narrow band of wavelengths to be absorbed by a fusing agent. The width of a narrow band of wavelengths may range from about 1 to about 30 nm.

The controller 150 may determine a third delay between the ejection of the print agents and an energy emission 495 to the build material layer 170.

Controlling the duration of the third delay enables the 3D printer 400 to fine tune the timings between the ejection of print agents and the emission of energy 495, and therefore, to optimize the interaction effect between the ejected print agents and the emitted energy. In an example, the third delay may be long enough such that a thermally curable agent is ejected and absorbed by a portion of build material layer before being exposed to the emitted energy, to avoid solvent evaporation above the build material layer 170. The third delay may also be based on the type of build material to be used to generate the 3D object. The controller 150 may therefore determine the first delay (see, e.g., block 240 of FIG. 2B) between the first and the second carriages (110, 120) based on the third delay.

In some examples, the controller 150 may additionally determine a fourth delay between the build material layer 170 generation and the energy emission 495, and therefore, to optimize the interaction effect between the build material layer and the emitted energy in, for example, a build material layer 170 preheating operation. The fourth delay may also be based on the type of build material to be used to generate the 3D object. The controller 150 may therefore determine the second delay (see, e.g., block 320 of FIG. 3) between the build material distributor 160 and the first carriage 110 based on the third delay.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A 3D printer comprising:
  a build material distributor moveable along an axis to generate a build material layer on a platform;
  a first carriage moveable along the axis, the first carriage comprising a first print agent dispenser to selectively eject a first set of print agents to the build material layer;
  a second carriage moveable along the axis, the second carriage comprising a second print agent dispenser to selectively eject a second set of print agents to the build material layer; and
  a controller to:
    receive data corresponding to a 3D object to be generated;
    control the build material distributor to generate a build material layer on the platform;
    determine a first amount of the first set of print agents and a second amount of the second set of print agents to be ejected at a portion of the build material layer based on the received data;
    determine a first delay between the ejection of the first amount of the first set of print agents and the second amount of the second set of print agents at the portion of the build material layer;
    independently control the movement of the first and second carriages and the ejection of print agents from the first and second print agent dispensers based on the determined first delay to generate the 3D object.

Feature set 2: An apparatus with feature set 1, wherein the controller is further to (i) determine a second delay between the build material layer generation and the ejection of the first amount of the first set of print agents at the portion of the build material layer; and (ii) independently control the movement of the build material distributor, the first carriage and the ejection of print agents from the first print agent dispenser based on the determined first and second delays to generate the 3D object.

Feature set 3: A 3D printer with any preceding feature set 1 to 2, wherein the controller is to identify the type of build material in which the 3D object is to be generated; and determine the first delay based on the type of build material.

Feature set 4: A 3D printer with any preceding feature set 1 to 3, wherein the first carriage is placed between the build material distributor and the second carriage.

Feature set 5: A 3D printer with any preceding feature set 1 to 4, further comprising an additional build material distributor placed at the opposite side of the second carriage with respect to the first.

Feature set 6: A 3D printer with any preceding feature set 1 to 5, wherein the first and/or the second carriage comprises an energy source to emit energy to a build material layer, and the controller is to further: (i) determine a third delay between the ejection of the print agents and an energy emission to the build material layer; and (ii) determine the first delay between the first and the second carriage based on third delay.

Feature set 7: A 3D printer with any preceding feature set 1 to 6, further comprising a set of print agent reservoirs.

Feature set 8: A 3D printer with any preceding feature set 1 to 7, wherein the set of print agent reservoirs include a fusing agent and a detailing agent, the first print agent dispenser to selectively eject the fusing agent and the detailing agent and the second print agent dispenser to selectively eject the detailing agent.

Feature set 9: A 3D printer with any preceding feature set 1 to 8, wherein the set of print agent reservoirs include a thermally curable binder agent.

Feature set 10: A printing apparatus comprising:
  a first carriage moveable along an axis, the first carriage comprising a first print agent dispenser to selectively eject a first set of print agents;
  a second carriage moveable along the axis, the second carriage comprising a second print agent dispenser to selectively eject a second set of print agents; and
  a controller to:
    receive data corresponding to a print job;
    determine a first amount of the first set of print agents and a second amount of the second set of print agents to be ejected at a print area based on the received data; determine a first delay between the ejection of the first amount of the first set of print agents and the second amount of the second set of print agents at the print area; and
    independently control the movement of the first and second carriages and the ejection of print agents from the first and second print agent dispensers based on the determined first delay to generate the print job.

Feature set 11: A printing apparatus with feature set 10, wherein the first and/or the second carriage comprises an energy source to emit energy to a build material layer, and the controller to further (i) determine a third delay between the ejection of the print agents and an energy emission to the build material layer; and (ii) determine the first delay between the first and the second carriage based on third delay.

Feature set 12: A method comprising:
  generating a build material layer on a platform;
  determining a first amount of a first set of print agents and a second amount of a second set of print agents to be ejected at a portion of the build material layer based on data corresponding to a 3D object to be generated, wherein a first carriage comprising a first print agent dispenser is to eject the first set of print agents and a second carriage comprising a second print agent dispenser is to eject the second set of print agents;
  determining a first delay between the ejection of the first amount of the first set of print agents and the second amount of the second set of print agents at the portion of the build material layer;
  moving the first and second carriages along an axis and ejecting print agents from the first and second print agent dispensers based on the determined first delay to generate the 3D object.

Feature set 13: A method with feature set 12, further comprising (i) determining a second delay between the build material layer generation and the ejection of the first amount of the first set of print agents at the portion of the build material layer; and (ii) independently moving a build material distributor to generate the build material layer, the first carriage and the ejection of print agents from the first print agent dispenser based on the determined first and second delays to generate the 3D object.

Feature set 14: A method with any of feature sets 12 to 13, further comprising (i) identifying the type of build material in which the 3D object is to be generated; and (ii) determining the first delay based on the type of build material.

Feature set 15: A method with any of feature sets 12 to 14, wherein the first and/or the second carriage comprises an energy source to emit energy to a build material layer, the method further comprising: (i) determining a third delay between the ejection of the print agents and an energy emission to the build material layer; and (ii) determining the first delay between the first and the second carriage based on third delay.

What it is claimed is:

1. A 3D printer comprising:
   a build material distributor moveable along an axis to generate a build material layer on a platform;
   a first carriage moveable along the axis, the first carriage comprising a first print agent dispenser to selectively eject a first set of print agents to the build material layer;
   a second carriage moveable along the axis, the second carriage comprising a second print agent dispenser to selectively eject a second set of print agents to the build material layer; and
   a controller to:
      receive data corresponding to a 3D object to be generated;
      control the build material distributor to generate a build material layer on the platform;
      determine a first delay between generation of the build material layer and ejection of a first amount of the first set of print agents at a portion of the build material layer based on the received data;
      determine the first amount of the first set of print agents and a second amount of the second set of print agents to be ejected at the portion of the build material layer based on the received data;
      determine a second delay between ejection of the first amount of the first set of print agents and the second amount of the second set of print agents at the portion of the build material layer; and
      independently control movement of the first carriage and the second carriage and the ejection of the first amount of the first set of print agents from the first print agent dispenser and the second amount of the second set of print agents from the second print agent dispenser based on the first delay and the second delay to generate the 3D object.

2. The 3D printer of claim 1, wherein the controller is further to:
   identify a type of build material in which the 3D object is to be generated; and
   determine the second delay based on the type of build material.

3. The 3D printer of claim 1, wherein the first carriage is placed between the build material distributor and the second carriage.

4. The 3D printer of claim 3, further comprising an additional build material distributor placed at an opposite side of the second carriage with respect to the first carriage.

5. The 3D printer of claim 1, wherein the first carriage and/or the second carriage comprises an energy source to emit energy to a build material layer, and the controller is to further:
   determine a third delay between the ejection of the first set of print agents and/or the second set of print agents and an energy emission to the build material layer; and
   determine the second delay between the first carriage and the second carriage based on the third delay.

6. The 3D printer of claim 1, further comprising a set of print agent reservoirs.

7. The 3D printer of claim 6, wherein the set of print agent reservoirs include a fusing agent and a detailing agent, the first print agent dispenser to selectively eject the fusing agent and the detailing agent and the second print agent dispenser to selectively eject the detailing agent.

8. The 3D printer of claim 6, wherein the set of print agent reservoirs include a thermally curable binder agent.

9. A printing apparatus comprising:
   a first carriage moveable along an axis, the first carriage comprising a first print agent dispenser to selectively eject a first set of print agents;
   a second carriage moveable along the axis, the second carriage comprising a second print agent dispenser to selectively eject a second set of print agents; and
   a controller to:
      receive data corresponding to a print job;
      determine a first delay between a build material layer generation and ejection of a first amount of the first set of print agents at a print area based on the received data;
      determine a second amount of the second set of print agents to be ejected at the print area based on the received data;
      determine a second delay between the ejection of the first amount of the first set of print agents and the second amount of the second set of print agents at the print area; and
      independently control movement of the first carriage and the second carriage and the ejection of the first amount of the first set of print agents from the first carriage and the second amount of the second set of print agents from the second print agent dispenser based on the first delay and the second delay to complete the print job.

10. The printing apparatus of claim 9, wherein the first carriage and/or the second carriage comprises an energy source to emit energy to the print area, and the controller to further
   determine a third delay between the ejection of the first set of print agents and/or the second set of print agents and an energy emission to the print area; and
   determine the second delay between the first carriage and the second carriage based on the third delay.

11. A method comprising:
   generating a build material layer on a platform;
   determining a first amount of a first set of print agents and a second amount of a second set of print agents to be ejected at a print area based on data corresponding to a 3D object to be generated, wherein a first carriage comprising a first print agent dispenser is to eject the first set of print agents and a second carriage comprising a second print agent dispenser is to eject the second set of print agents;
   determining a first delay between generation of the build material layer and ejection of the first amount of the first set of print agents at the print area;

determining a second delay between ejection of the first amount of the first set of print agents and the second amount of the second set of print agents at the print area;

moving the first carriage and the second carriage along an axis and ejecting the first amount of the first set of print agents from the first print agent dispenser and the second amount of the second set of print agents from the second print agent dispenser based on the determined second delay to generate the 3D object.

12. The method of claim 11, further comprising:

independently controlling a build material distributor to generate the build material layer, the first carriage and the ejection of print agents from the first print agent dispenser based on the determined first delay and the determined second delay to generate the 3D object.

13. The method of claim 11, further comprising:

identifying a type of build material in which the 3D object is to be generated; and determining the second delay based on the type of build material.

14. The method of claim 11, wherein the first carriage and/or the second carriage comprises an energy source to emit energy to the build material layer, the method further comprising:

determining a third delay between ejection of the first set of print agents and/or the second set of print agents and an energy emission to the print area; and determining the second delay between the first carriage and the second carriage based on the third delay.

* * * * *